United States Patent

Holmlund et al.

Patent Number: 5,850,179
Date of Patent: Dec. 15, 1998

[54] LATENCY COUNTER FOR SCANNING TIMERS

[75] Inventors: Dan Jones Holmlund, Upsala; Alvaro Sanchez Leon, Stockholm, both of Sweden

[73] Assignee: Telefonaktiebolaget LM Ericsson, Stockholm, Sweden

[21] Appl. No.: 749,247

[22] Filed: Nov. 15, 1996

[51] Int. Cl.⁶ ................................................. G08B 26/00
[52] U.S. Cl. ................ 340/518; 340/825.05; 340/825.2; 340/506; 340/501; 370/85.5; 370/85.4
[58] Field of Search ............................... 370/85.5, 85.4; 340/825.5, 825.51, 825.05, 825.2, 825.04, 506, 501, 518

[56] References Cited

U.S. PATENT DOCUMENTS

| | | | |
|---|---|---|---|
| 5,123,111 | 6/1992 | Delory et al. | 455/34.1 |
| 5,235,593 | 8/1993 | Grow et al. | 370/85.5 |

FOREIGN PATENT DOCUMENTS

| | | | |
|---|---|---|---|
| 0586768 | 3/1994 | European Pat. Off. | G06F 9/46 |
| 0710913 | 5/1996 | European Pat. Off. | G06F 13/40 |
| WO94/10810 | 5/1994 | WIPO | H04Q 7/00 |

*Primary Examiner*—Edward Lefkowitz
*Assistant Examiner*—Daryl C. Pope
*Attorney, Agent, or Firm*—Burns, Doane, Swecker & Mathis, L.L.P.

[57] ABSTRACT

A latency counter for use in relatively complex systems having relatively large numbers of devices with associated timers. Whenever a timer is activated by setting a time period, the latency counter is set to the larger of its current value or a value associated with the time period of the last-expiring timer. Prior to scanning the timers to determine if a timer has expired, the latency counter is checked. If the value of the latency counter is equal to a predetermined value, then no timers are active and no scanning is performed. If the value of the latency counter is not equal to the predetermined value, the latency counter value is modified and a scanning operation of each timer is performed to determine if any timers have expired. Considerable processing resources can be saved.

16 Claims, 5 Drawing Sheets

LATENCY COUNTER FOR SCANNING TIMERS

FIELD OF THE INVENTION

The present invention relates generally to complex systems having a relatively large number of timers associated with components of the system. More particularly, the present invention is directed to a latency counter for scanning timers in a complex system.

BACKGROUND OF THE INVENTION

In complex systems having many devices, timers are often necessary to coordinate the performance of the many operations which are inherent in such systems. Such complex systems can include sensors, switches, transmitters, engines, etc. Timers associated with each of these or other devices can be set to indicate that some action must be performed by or on the associated device when the set time period expires. A practical example of a system employing such timers is a telecommunication system which includes many components which are subject to faults. Because many faults can occur due to temporary malfunctions (e.g., power glitches), when component faults are detected, the faulty component(s) enter into a passive state for a predetermined interval defined by a timer. When the timer expires at the end of the predetermined interval, the component is reactivated to determine if the fault was due to a temporary malfunction or whether the component needs to be repaired or replaced. Since a typical telecommunications system includes many such components, continuously monitoring all components requires a significant portion of system resources.

Conventionally, the timers associated with related devices are scanned at each clock interval to determine if any expired timers exist, and hence if any operations must be performed. Scanning is generally performed either by sequentially scanning all timers in the system, or by scanning the timers according to the contents of a sorted list of timers. The sorted list is a list of active timers only. Searches are performed by monitoring only the portion(s) of the list that contains particular timeout values. There are disadvantages associated with both of these systems for monitoring timers.

More particularly, in systems which employ a sequential search, the system has no way of knowing when there are no timers set. In other words, all timers are searched at each interval. While a check of the list of all timers can be performed to determine if any active timers exist, this check amounts to an additional scan operation of the list of all timers. Since the situation where no timers are activated is a relatively frequent occurrence (indeed, is typically the normal state of operation), the sequential search method has the disadvantage of wasting system resources.

In systems which employ a sorted list, scanning is not initiated until the list contains at least one active timer. However, a sorting procedure must be performed each time a new timer is activated to insert the newly-activated timer at an appropriate position in the list of timers. Further, a removal procedure must also be performed to identify and remove a particular timer from the list. This sorting procedure is inefficient, and also wastes system resources, especially when removing timers.

It would be desirable to be able to monitor a relatively large number of timers in a complex system in an efficient manner so as to ensure that required operations are performed at the appropriate times and in an appropriate order.

It would further be desirable to be able to monitor components in a telecommunications system more efficiently, so that system efficiency can be improved.

SUMMARY OF THE INVENTION

To overcome the above problems, and to achieve other advantages, the present invention provides for a counter, method and system for monitoring a relatively large number of device timers associated with the devices of a relatively complex system. According to the present invention, a latency counter is provided which is set when any one of the timers associated with the system is set. Each time a new timer is set which has a time value larger than the current value of the latency counter, the latency counter is reset to the larger time value. Prior to scanning the timers, the system first determines whether the latency counter has a predetermined value (e.g., 0). If the latency counter value is not equal to the predetermined value, the latency counter value is adjusted (e.g., towards the predetermined value), and the timers are scanned to determine if any operations are necessary.

As a result of the present invention, the need to scan through the timers when no timer is active is avoided. Further, inefficient sorting procedures are also avoided. Thus, significant system resources can be reallocated as needed to improve the system. The present invention has significant practical utility in a telecommunications system.

BRIEF DESCRIPTION OF THE DRAWINGS

The features and advantages of the present invention will be more fully understood upon reading the following Detailed Description of the Preferred Embodiments in conjunction with the accompanying drawings, in which like reference indicia designate like elements, and in which.

DETAILED DESCRIPTION OF THE PREFERRED EMBODIMENTS

Figure 1:
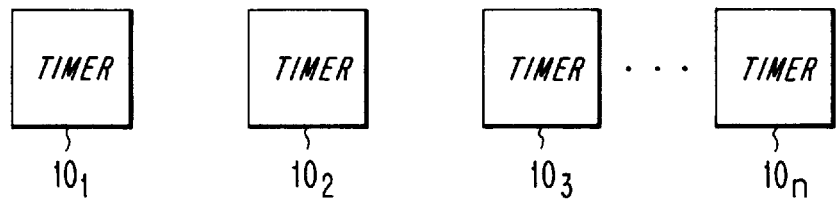
FIG. 1 is a block diagram of a plurality of timers in a system.

Referring now to FIG. 1, a collection of timers $10_1$, $10_2$, $10_3$, . . . $10_n$ are shown. Each timer is associated with a device or component of a system. It should be appreciated that the concepts of the present invention may be conveniently implemented in any relatively complex system having a plurality of timers associated with various components or devices of the system. The timers can each be activated by setting a time period, and the expiration of the set time period serves as an indication that some operation must be performed by, on, or using the device associated with that timer. Such systems can include engines, computers systems, systems with sensors, transmitters and receivers, as well as many other systems too numerous to mention specifically. According to a preferred embodiment of the present invention, the system is a telecommunications system, and the devices or components are elements (e.g., digital transceiver module boards located in a base station) or transcoders located in a switch in the telecommunications system. The devices can thus be located in a telecommunication switch or in equipment connected to or related to the switch (e.g., a base station). The devices can be hardware or software. To determine whether any of the timers are expired, and thus whether some action needs to be performed by, to, or using the device associated with the expired timers, the timers of FIG. 1 can be scanned sequentially or on the basis of a sorted list, as described above. However, such methods have the disadvantages and inefficiencies described above.

Figure 2:
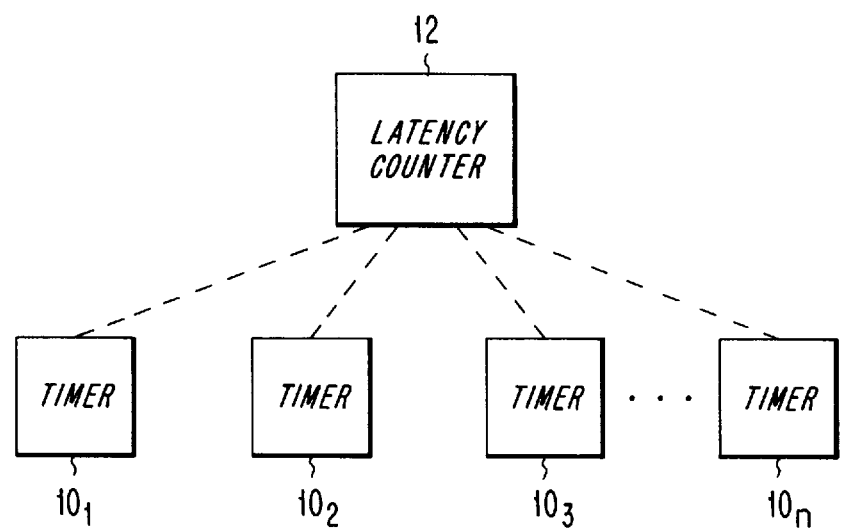
FIG. 2 is a block diagram of the plurality of timers of FIG. 1 used in conjunction with a latency counter according to the present invention.

Referring now to FIG. 2, a latency counter 12 has been added to the counter configuration of FIG. 1. The latency counter is activated whenever one of the timers $10_1$–$10_n$ are activated. Whenever additional timers are activated, the latency counter is notified, and the current latency counter value is adjusted only if a new timer is activated with a value corresponding to a time period which is longer than the time period corresponding to the current value of the latency counter. Thus, the latency counter always maintains a value corresponding to the time period of the activated timer which is the last timer to expire in the system.

A value other than some initial predetermined value in the latency counter indicates that there is at least one activated timer in the system, and that the timers should be scanned. Each time a scanning operation occurs, the value of the latency counter is adjusted toward the predetermined initial value. According to a preferred implementation, the latency counter has a predetermined initial value of zero, some positive value (e.g., corresponding to a number of clock intervals or scanning intervals) replaces the initial value when the latency counter is activated, and the latency counter is decremented by one for each scanning operation. It will be appreciated that numerous insubstantial changes can be made to this preferred latency counter. For example, numerous alternative initial values or activation values can be used, and the latency counter can be incremented rather than decremented by values other than one.

After the latency counter has expired, the system knows that there are no activated timers associated with any device, and no scanning operations are necessary. It will be appreciated that some types of devices may have timers which can be reset from an active state to an inactive state based on events internal to the device or external to the system. To accommodate such devices, the latency counter and system according to the present invention may simply ignore the resetting of any timers, and continue scanning.

Alternatively, in situations where the probability of the presence of an active timer other than the timer to be reset is relatively low (e.g., below a certain threshold), and the number of clock cycles or scanning cycles until the timer to be reset should expire (after the reset) is high (e.g., is above a certain threshold), the latency counter can be updated as follows. First, the latency counter and the timer to be reset are compared in a suitable comparator. If the timer to be reset would expire (after the reset) earlier than the latency counter, then there must be other devices with active timers in the system and the value of the latency counter does not need to be modified. If the latency counter and the timer to be reset are equal, all devices should be checked to see if there are any other active timers. If so, the latency counter should be modified so that its value corresponds to the time when the last active timer will expire.

Figure 3:
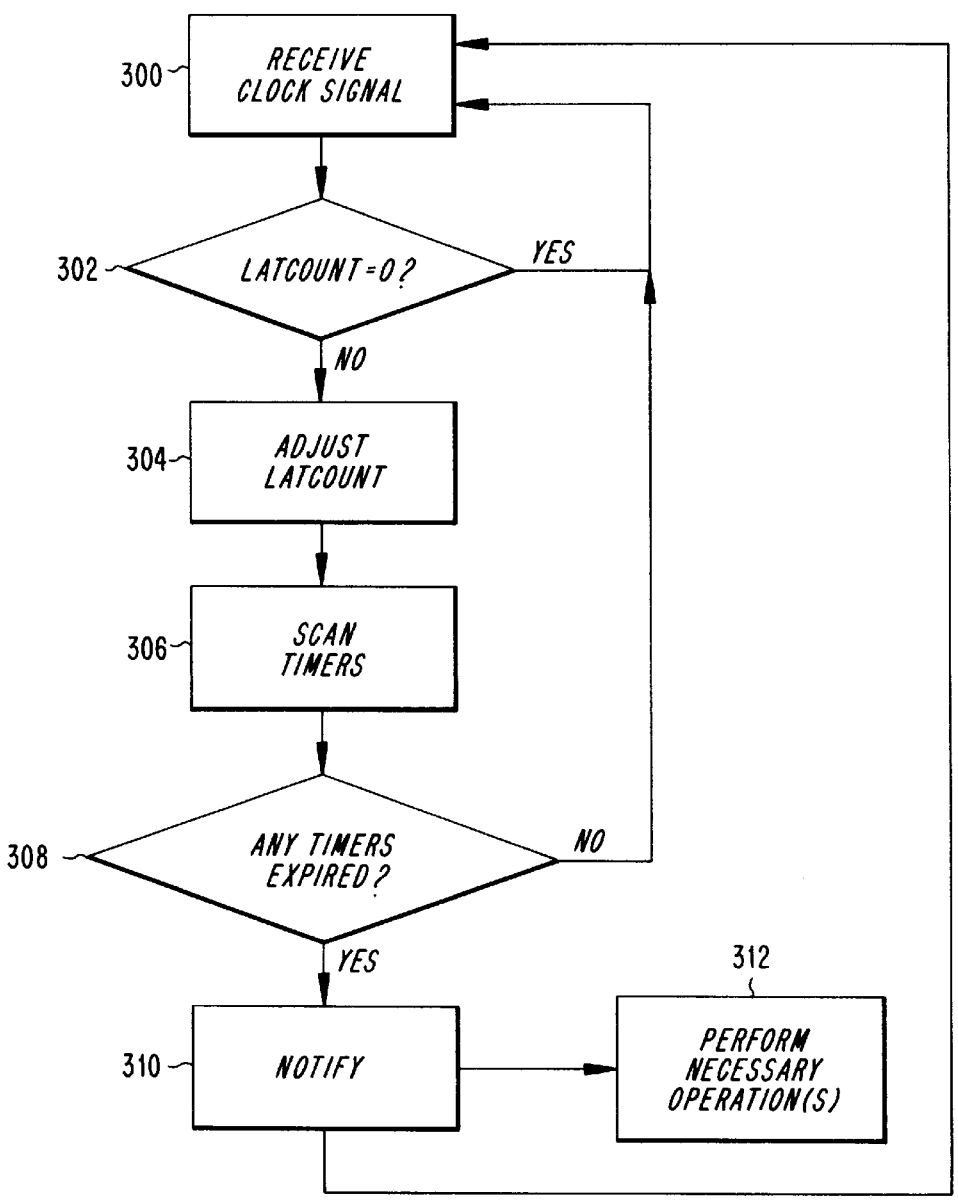
FIGS. 3A–3B are flow charts describing the steps of a method according to the present invention.

Referring now to FIG. 3A, a flow chart describing a timer setting method in accordance to the present invention is shown. In step 100, an event occurs which requires a timer to be set. In step 102, the timer corresponding to the device associated with the event is set. In step 104, the value LATCOUNT of the latency counter is adjusted as described above.

Referring now to FIG. 3B, a flow chart describing the steps of a method for scanning timers according to an embodiment of the present invention is shown. In step 300, a clock signal is received. In step 302, it is determined whether the value LATCOUNT of the latency counter is equal to a predetermined value (e.g., 0). If LATCOUNT=0, then there are no active timers, and the process returns to step 300. If LATCOUNT≠0, then active timers are present in the system, and in step 304, LATCOUNT is adjusted. In this example, LATCOUNT is decremented by one (i.e., LATCOUNT=LATCOUNT−1). In step 306, a scanning operation is performed over all timers in the system (e.g., using a conventional sequential searching technique), and the presence of expired timers is determined in step 308. If one or more active timers have expired, then the system notifies the appropriate device(s) in step 310, performs necessary operations in step 312, and returns to step 300 to await the next clock signal. If step 308 determines that no active timers have expired, the process returns to step 300 to await the next clock signal.

Figure 4:
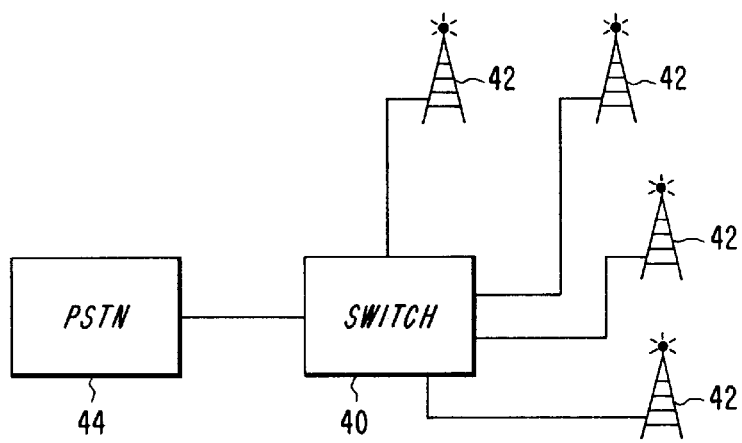
FIG. 4 is a diagrammatical representation of a telecommunications system in which the timer and method of the present invention can be implemented.
Figure 5:
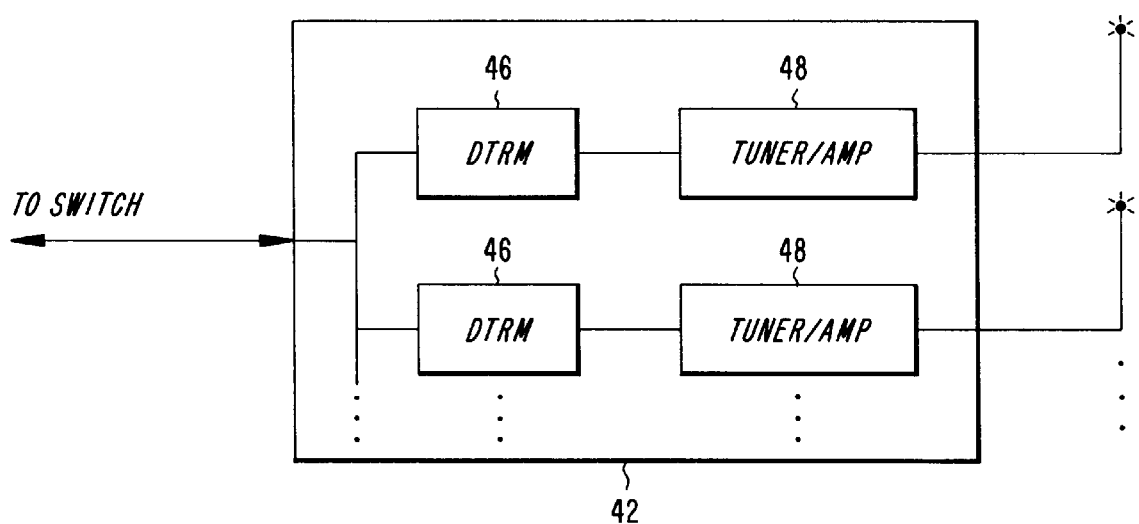
FIG. 5 is a diagrammatical representation of a portion of a base station in the system of FIG. 4.

As discussed above, the present invention has practical utility in a wide variety of applications. A preferred application will now be discussed. Referring now to FIG. 4, a telecommunication system in which the timer scanning method of the present invention can be implemented is shown. The system includes a switch 40, base stations 42 connected to the switch 40 via conventional cables, and a public switched telephone network (PSTN) 44, also connected to the switch 40 via conventional cables. It will be appreciated that, while the PSTN 44 is not involved in this embodiment, the invention is applicable to PSTN networks. As is well known in the art, the switch 40 can be a mobile switching center (MSC), which controls significant resources in the telecommunication system to allow speech, message data, and control data to be exchanged between the base stations 42 and various mobile telephone units (not shown). Included in these resources are digital transceiver module (DTRM) boards, which are typically located in the base stations 42 of a telecommunication system, as shown in FIG. 5. The DTRM boards 46 perform functions such as speech compression and channel encoding of a signal prior to amplification in, and transmission from, a tuner/amplifier 48. A switch capable of handling, e.g., 48,000 mobile telephone calls simultaneously might need approximately 16,000 DTRM boards (i.e., roughly 3 calls per board).

After some period of usage, a fault (such as a faulty integrated circuit chip on the DTRM circuit board, or due to some external disturbance or malfunction) may be detected in a DTRM board. Upon the detection of such a fault, the switch 40 is notified and the faulty DTRM board enters a passive state. Since the fault may be caused by external disturbances such as a power glitch, the switch will wait some predetermined period of time (e.g., using a timer as described above) and then reactivate the DTRM board. If the DTRM board still appears to be faulty, the switch is notified and the board enters a permanent passive state until replaced. In such a system incorporating the present invention, a switch clock with a clock interval of, for example, one second is provided, and a timer is provided for each DTRM board (e.g., roughly 16,000 timers). A latency counter can be used when a fault is detected in a DTRM board. Rather than using system resources (e.g., the switch 40 or other suitable means) to scan every timer each second, the latency counter can save considerable switch processing resources by providing an indication of whether scanning is needed or not. This allows the switch or other suitable timer monitoring means to be used more efficiently.

Figure 6:
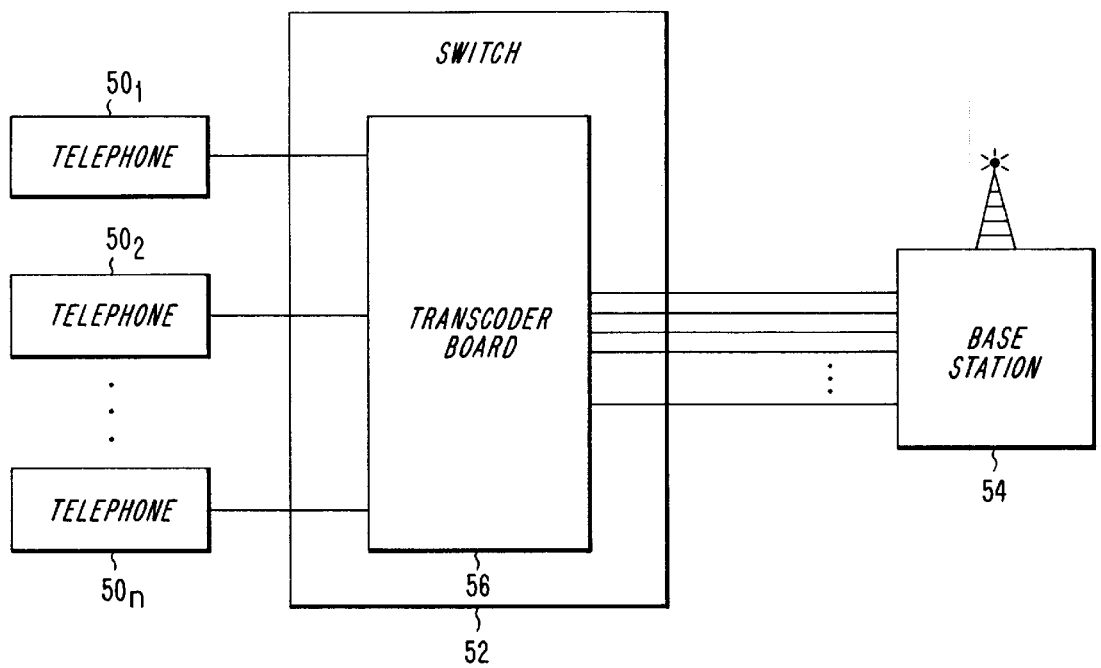
FIG. 6 is a diagrammatical representation of an alternative embodiment of the present invention.
Figure 7:
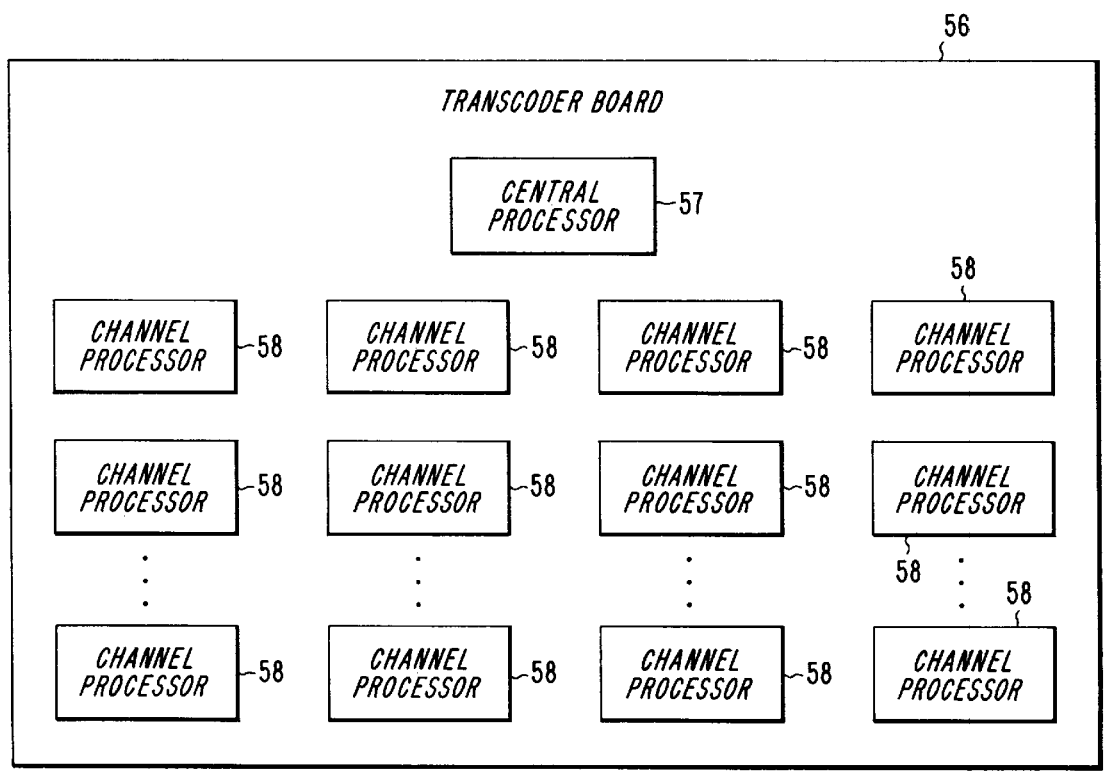
FIG. 7 is a diagrammatical representation of the transcoder board of FIG. 6.
Figure 8:
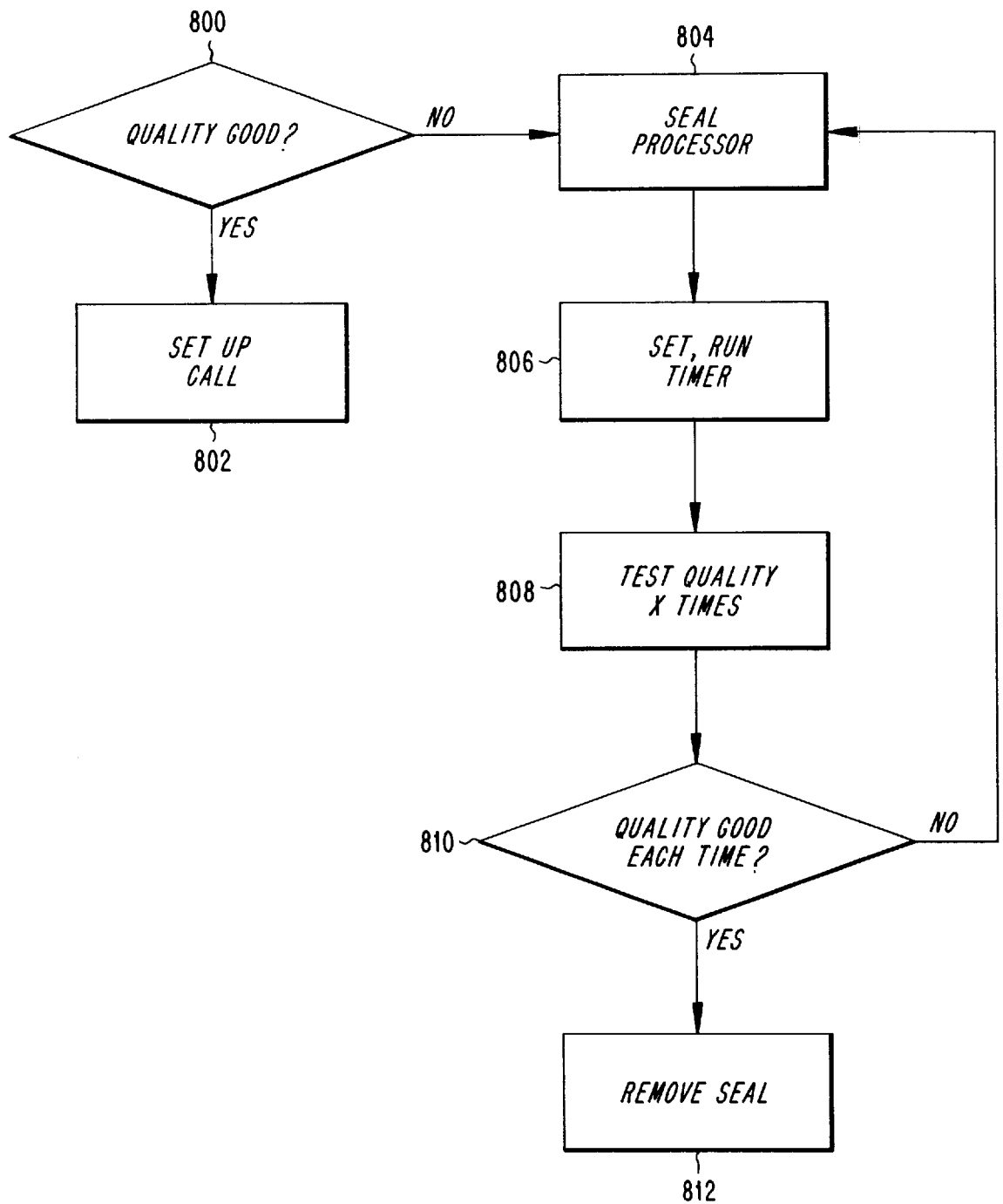
FIG. 8 is a flow chart describing a portion of a call set-up procedure in the embodiment of FIG. 6.

Referring now to FIGS. 6–8, an alternative application of the present invention is shown. In this example, telephones $50_1, 50_2, \ldots 50_n$ are connected through switch 52 to a base station 54. Switch 52 includes a transcoder board 56 for performing voice coding. FIG. 7 shows the transcoder board 56 in more detail. Transcoder 56 includes a central processor 57 and a large number of channel processors 58 to handle the large number of calls processed through the switch 52. The switch 52 in this case controls a large number of transcoder boards 56, and must also control the large number of individual channel processors 58 on each transcoder board.

Referring now to FIG. 8, a flow chart describing a portion of the call set-up procedure in the system of FIGS. 6 and 7 is shown. In step 800, prior to call set-up, a first channel processor tests the quality of signal transmission to the base station. If the quality is good (e.g., meets a predetermined threshold), then the switch sets up the call in step 802. If the quality is not good (e.g., does not meet the predetermined threshold), the switch 52 renders unavailable, or "seals", the first channel processor in step 804. The switch 52 then sets a first timer to define the period of unavailability for the sealed processor in step 806. After the timer expires, the switch 52 performs a re-check operation on the first channel processor by testing the quality one or more times in step 808. The switch determines in step 810 if the signal quality is good (e.g., meets the predetermined threshold) for each quality test. If not, the procedure returns to step 804 and the processor remains sealed. If signal quality is good for each test, the "seal" is removed in step 812, and the first channel processor becomes available for use. A typical system might have on the order of tens of thousands of channel processors. A transmission disturbance, while rare, can simultaneously affect a relatively large number of channel processors and cause a relatively large number of timers to be set and scanned according to the present invention.

Other telecommunication applications of the present invention include the monitoring of mobile telephones registered to a particular system. Typically, each active mobile station reports its presence to the system at regular, predefined intervals. If a mobile station does not report its presence at the scheduled time (e.g., because the mobile unit has been switched off or has left the geographic area serviced by the system), the system can set timers associated with non-reporting mobile stations (or software representations thereof) and perform timeout operations (e.g., removing non-reporting mobile stations from a list of active mobile stations) after the timers have expired.

Further alternative applications include systems for scheduling periodic appointments for certain individuals. For example, a timer could be associated with each individual in the database of a dentist's computer. The expiration of each timer would indicate, in this example, that it is time for the associated individual to schedule a dentist appointment.

While the foregoing description includes many details and specificities, it is to be understood that these are merely for purposes of explanation. Therefore, the above description is to be taken as illustrative of the present invention, and is not to be construed as limiting the invention in any way. Numerous insubstantial changes will be readily apparent to those of ordinary skill in the art which do not depart from the spirit and scope of the invention, as defined by the following claims and their legal equivalents.

What is claimed is:

1. A method for monitoring a plurality of timers, comprising the steps of:

activating one or more of the plurality of timers by setting one or more time periods, each time period expiring when a timeout operation is needed;

activating a latency counter associated with the plurality of timers by setting the maximum of a current value of the latency counter and the one or more time periods;

determining whether the latency counter has counted to a predetermined value; and if the latency counter has not counted to the predetermined value, adjusting the latency counter, and scanning the plurality of timers to determine if any of the timers indicate the need for one or more timeout operations.

2. The method of claim 1, wherein the predetermined value is zero, and wherein the step of adjusting is performed by decrementing the latency counter by a value of one.

3. The method of claim 1, wherein the plurality of timers are associated with one or more devices of a telecommunication system.

4. The method of claim 3, wherein at least one of the one or more timeout operations is a determination of whether a device is faulty.

5. The method of claim 4, wherein the device is a digital transceiver module board.

6. The method of claim 4, wherein each timer is associated with a single device.

7. The method of claim 3, wherein the devices include one or more transcoder boards contained in one or more switches of the telecommunication system.

8. The method of claim 3, wherein the devices represent one or more mobile stations in the telecommunication system, the mobile stations periodically providing registration information to the system, and corresponding timers are activated when registration information is not received by the telecommunication system within a predetermined time interval.

9. A system for monitoring a plurality of timers, comprising:

a plurality of timers, each timer associated with a device component and capable of being activated by setting a time period, the time period expiring when a timeout operation is needed;

at least one latency counter associated with the plurality of timers, each latency counter capable of being activated, by setting the maximum of a current value of the latency counter and the one or more time periods, when a timer is activated; and monitoring means for determining whether an activated latency counter has counted to a predetermined value, adjusting the activated latency counter if the activated latency counter has not counted to the predetermined value, and scanning the plurality of timers to determine if a timeout operation is needed.

10. The system of claim 9, wherein the predetermined value is zero, and wherein the monitoring means adjusts the activated latency counter by decrementing the latency counter by a value of one.

11. The system of claim 9, wherein the plurality of timers are associated with one or more devices of a telecommunication system.

12. The system of claim 11, wherein the timeout operation is a determination of whether a device is faulty.

13. The system of claim 12, wherein the device is a digital transceiver module board.

14. The system of claim 12, wherein each timer is associated with a single device.

15. The system of claim 11, wherein the devices include one or more transcoder boards contained in one or more switches of the telecommunication system.

16. The system of claim 11, wherein the devices represent one or more mobile stations in the telecommunication system, the mobile stations periodically providing registration information to the telecommunication system, and corresponding timers are activated when registration information is not received by the telecommunication system within a predetermined time interval.

* * * * *